United States Patent [19]

Meyers

[11] Patent Number: 4,602,683

[45] Date of Patent: Jul. 29, 1986

[54] METHOD OF INHIBITING SCALE IN WELLS

[75] Inventor: Kevin O. Meyers, Plano, Tex.

[73] Assignee: Atlantic Richfield Company, Los Angeles, Calif.

[21] Appl. No.: 626,087

[22] Filed: Jun. 29, 1984

[51] Int. Cl.$^4$ ............... E21B 43/12; E21B 43/27
[52] U.S. Cl. .................. 166/279; 166/244.1; 166/300; 166/307; 166/371
[58] Field of Search ............ 166/244 C, 279, 307, 166/310, 371; 252/8.55 B, 8.55 E

[56] References Cited

U.S. PATENT DOCUMENTS

| | | | |
|---|---|---|---|
| 3,167,123 | 1/1965 | Graham et al. | 166/279 |
| 3,467,192 | 9/1969 | Nolan, III et al. | 166/279 |
| 3,633,672 | 1/1972 | Smith et al. | 166/279 |
| 3,654,993 | 4/1972 | Smith et al. | 166/279 |
| 3,703,928 | 11/1972 | Fulford | 166/279 X |
| 3,782,469 | 1/1974 | Fulford | 166/279 |
| 4,357,248 | 11/1982 | Berkshire et al. | 166/279 X |
| 4,393,938 | 7/1983 | Lawson et al. | 166/279 |

*Primary Examiner*—George A. Suchfield
*Attorney, Agent, or Firm*—M. David Folzenlogen; Michael E. Martin

[57] ABSTRACT

Scale deposition is inhibited with a new scale inhibitor precipitation squeeze method wherein inhibitor solution is injected at a higher first pH into a subsurface brine producing formation. Thereafter, the solution is subjected to a fluid or substance which lowers the higher first pH of the scale inhibitor solution to a lower second pH, thereby causing precipitation of scale inhibitor in the formation. The scale inhibitor is characterized by the fact that the scale inhibitor exhibits a significant solubility decrease between the higher first pH and the lower second pH. The method of this invention, therefore, is based on decreasing the pH the scale inhibitor solution to deposit the scale inhibitor and does not use prior art divalent cation precipitation methods to precipitate inhibitors. This invention lessens the chances of formation damage or plugging. The preferred scale inhibitors are the amine phosphonates of a given general structure. The most preferred scale inhibitors are ethylenediaminetetra (methylenephosphonic acid) and hexamethylenediaminetetra (methylenephosphonic acid). Precipitation by pH may be accomplished by by keeping the well shut in and allowing low pH forming formation fluids to equilibrate with the injected scale inhibitor solution. Alternatively, the scale inhibitor may be precipitated by injecting a second solution having a pH lower than the second pH into the formation or a substance that lowers the pH of the inhibitor solution to the second pH.

21 Claims, No Drawings

METHOD OF INHIBITING SCALE IN WELLS

BACKGROUND OF INVENTION

This invention relates to subsurface scale inhibitor squeeze treatments. More particularly, a solution of a scale inhibitor having a solubility that significantly decreases with decreasing pH is injected into a subsurface formation adjacent a production well and thereafter the pH of the solution is lowered to precipitate the scale inhibitor in the formation.

Production of water, oil and gas is frequently hampered by deposition of scales, for example, calcium carbonate, calcium sulfate, barium sulfate, magnesium carbonate, magnesium sulfate, and strontuim sulfate. Scale deposition may result in reservoir damage, stuck subsurface pumps, plugged casing perforations, and plugged tubing and other subsurface equipment. Scale may also interfere with the operation of surface flowlines and other surface equipment through which the produced fluids pass and/or treated.

Sometimes scale problems may be relieved by changes in mechanical and other operational changes, but in many situations, it is necessary to resort to treatment with chemical scale inhibitors. During the past decade a great deal of research has provided increased knowledge of the way scale inhibitors work. Scale deposition is a complex crystalline process where the crystallizing mineral exceeds its solubiilty limit. This can be caused by a number of factors such as pressure and temperature changes, agitation, mixing of fluids and the like. After supersaturation occurs, nucleation takes place with initial formation of a precipitate or insoluble phase of the crystal forming mineral. This process can occur spontaneously or be promoted by the presence of already formed scale crystals or presence of other extraneous insoluble material such as sand particles, corrosion products or imperfections on surfaces. Scale ions contact a nuclei of very small size and absorb or become incorporated into the nuclei in a manner such that the crystal grows in a crystalline pattern. When this crystalline growth process is interfered with, crystalline growth of scale deposition is altered and even prevented.

Scale inhibitors function at threshold levels, for example, less than 10 to 50 ppm, by inhibiting crystal growth and adherence of the scale. The inhibitor, therefore, must be present during scale nucleation so that the growth sites are immediately positioned by the inhibitor. Evidence of this has been abundantly provided by comparing crystals formed in the presence and absence of a scale inhibitor. This means that the scale inhibitor must be in the scale forming water prior to the change or mixing or other phenomenon, for example, pressure or temperature drops near the formation face or casing perforations, can cause scale deposition. To prevent scale deposition at the formation face or in the casing perforations, the scale inhibitor must be present in the formation and be slowly dissolved or desorbed from the rock surface into the produced formation waters on an uninterrupted basis in the produced formation waters that form scale. To accomplish these results, frequently scale inhibitors are pumped or squeezed into the formation. Sufficient inhibitor is squeezed at sufficient frequency to dissolve enough scale inhibitor in the produced water to satisfy the needs of the system being treated. Numerous publications and patents discuss scale and its prevention or alleviation, for example, patent Nos. 3,704,750 and 3,827,977 which describe scale inhibitor squeeze techniques.

Typical scale inhibitors are phosphates, phosphonates, polymaleic acids, polymers and phosphate esters. Some squeeze techniques rely on physical adsorption of the scale inhibitor onto the formation matrix rock. As formation waters are produced in a treated well, the inhibitor is desorbed from the rock matrix and feeds back with the produced fluids. But adsorption squeeze procedures result in limited squeeze life.

In addition to adsorption, inhibitor may be retained in the formation during a squeeze treatment by precipitation. In this process, the inhibitor is precipitated within the interstices of the formation. When the well is returned to production, the scale inhibitor precipitate redissolves slowly over an extended period of time to provide the necessary active inhibition as waters are produced into the wellbore. Scale inhibitor squeezes relying on precipitation typically use scale inhibitors that are precipitated by divalent cations. Generally, the acidic scale inhibitor solution, with or without acid retarders, is squeezed into the formation where the acid usually reacts with calcium carbonate in the formation producing divalent calcium ions. The divalent cations combine with the scale inhibitor and cause it to precipitate. Such precipitation in the matrix increases scale inhibitor retention and thereby increases treatment life. In addition, to the acid and calcium carbonate reaction, the divalent cations needed to precipitate the scale inhibitor may be naturally occurring in the reservoir brine, ion-exchanged from the reservoir rock or injected into the formation with the inhibitor. Unfortunately, inherent in these typical precipitation processes is the competition between scale formation and scale inhibitor precipitation. Therefore, if care is not taken in these squeeze applications, the formation near the well can be severly damaged.

It is an object of this invention to provide an inhibitor squeeze technique that does not depend on divalent cations to precipitate the scale inhibitor. It is a further object of this invention to describe a scale inhibitor squeeze process wherein scale inhibitor is precipitated in a subsurface water, gas or oil producing formation in a manner that is less likley to damage the conductivity of the producing formation. It is still a further object of this invention to provide a scale inhibiting formation squeeze method that may be repeated when scale inhibitor return concentration falls below necessary threshold concentrations over and over again without increasing formation damages by inhibitor precipitation.

SUMMARY OF INVENTION

This invention provides a new scale inhibitor precipitation squeeze method wherein the scale inhibitor is deposited in the interstices of a brine producing formation in a way that lessens the chances of formation plugging. In the process of this invention, scale formation in a well producing brine from a subsurface formation is inhibited by injecting into the formation an aqueous scale inhibitor solution. The scale inhibitor is characterized by the fact that the scale inhibitor is significantly more solûble in water at a first higher pH than it is at a second lower pH. The preferred scale inhibitors are the amine phosphonates including salts thereof. For example, ethylenedimainetetra (methylenephosphonic acid) and hexamethylenediaminetetra (methylenephosphonic acid) both exhibit a significant decrease in solubility in water when the pH of the water is lowered from 6 to 5. After placement of the solution in the formation, the scale inhibitor solution injected into the formation at a first higher pH is subjected to a fluid or substance which lowers the pH of the scale inhibitor solution to a second lower pH, thereby causing precipitation of scale inhibitor in the interstices of the formation. When brine is thereafter produced from the formation, it redissolves some of the scale inhibitor thereby inhibiting scale formation in the well. If the well produces fluids with are below second lower pH, the scale inhibitor may be precipitated by keeping the well shut in and allowing formulated fluids in the formation to equilibrate with the injected scale inhibitor solution. Alternatively, the scale inhibitor may be precipitated by injecting a substance that lowers the pH of the scale inhibitor solution or by injecting a second solution having the desired lower pH into the formation.

DETAILED DESCRIPTION OF PREFERRED EMBODIMENTS

Oil and gas wells produce hundreds of billions of gallons of salt containing waters that are complex and diverse. These wells produce many types of mineral scale deposits. These deposits which cause enormous losses to the industry may occur at any time or place from the face of the formation or at perforations in the casing or in the well tubing or other subsurface equipment. Batch and continuous injection of scale inhibiors and cleaning agents have long been tried, but for the most part they are overly expensive and these treatments freqquently do not reach the point of initial scale formation, for example the face of the subsurface formation. In order to work effectively, scale inhibitor in sufficient concentration must be present prior to and at the point of threshold scale formation, that is, scale nucleation, precipitation or crystal growth. This requirement of availability at threshold lead to development of scale inhibitor squeeze procedures. Normal scale inhibitor squeeze techniques rely either on physical adsorption of chemical onto the formation rock or precipitation of the scale inhibitor in the matrix of the formation. Precipitation techniques are preferred since they increase inhibitor retention and, thus, treatment life. Conventional precipitation squeeze solutions are usually formulated to a pH of 4 to 5. These conventional inhibitor solutions rely on divalent cations to precipitate the scale inhibitor and inherent in these processes is a competition between scale formation and inhibitor precipitation. Therefore, if care is not taken in their application, the well can be severely damaged. In the process of this invention, the possibility of damaging precipitation in the wellbore is overcome by using a decrease in pH (not divalent cations) to precipitate the scale inhibitors. The scale inhibitors employed in this invention must exhibit a significant solubility decrease in water when the pH of the inhibitor solution is lowered from a readily useable initial higher value to a readily attainable second lower value. Of course, in addition to relative solubilities at high and low pH and price, the scale inhibitors are also selected on the basis of their ability to prevent scale nucleation, to retard scale crystal growth, to alter scale crystal growth patterns, to decrease adhesion to other surfaces or scale crystals, to remain stable, to be active at low concentrations, to not create adverse side reactions, and to be detected. The preferred scale inhibitors having the necessary special solubility qualities and satisfying other desired characteristics are the amine phosphonates of the general structure:

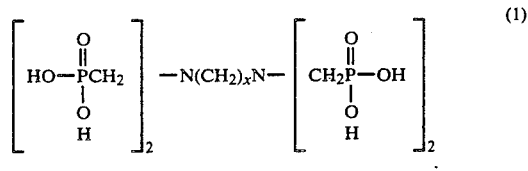

where x is equal to or greater than 2.

As used herein, the words "amine phosphonates" include the salts thereof. The best amine phosphonate scale inhibitors are ethylenediaminetetra (methylenephosphonic acid) and hexametheylenediaminetetra (methylenephosphonic acid) which have a solubility greater than 100 grams per liter at pH above 6 and less than 5 grams per liter at pH below 5. These most preferred amine phosphonates are easily formulated into scale inhibitor solutions for use in oil, gas and brine producing subsurface formations. Their solutions have long shelf lives.

Briefly, the special scale inhibitors of this invention are dissolved or mixed with water having a first higher pH selected on the basis of their solubility characteristics. The inhibitor solution at this first higher pH is then injected into a brine producing subsurface formation. Thereafter, the scale inhibitor is precipitated in the brine producing formation by lowering the pH to a second lower pH also selected on the basis of the solubility characteristics of the scale inhibitor or inhibitors being used. After inhibitor precipitation, the well is put back on production and the scale inhibitor slowly redissolves in the produced brine to provide the necessary threshold scale prevention. Scale prevention is not fully understood, but it has been shown that the scale inhibitors do prevent hundreds of times more scale than inhibitor used and that squeeze scale inhibitor precipitation may provide protection for up to twenty-four months and longer.

In the scale inhibitor method of this invention, a scale inhibitor solution of the special inhibitor in water is injected and treated in such a way that the scale inhibitor is precipitated in the interstices of the formation as a slightly soluble solid that returns to the well bore at low scale inhibiting concentrations (e.g. about 20 ppm or less) when scale forming brine is produced from the formation. The amount and concentration of scale inhibitor solution used per treatment depends on many factors, such as for example, salts in the formation brine, temperature, pressure, scale nucleation and crystal growth mechanisms, inhibitor concentration, and other hydrodynamic conditions. The amount and concentration of scale inhibitor injected also depends on the manner in which the pH is lowered to precipitate the scale inhibitor. The amount and concentration of scale inhibitor injected also depends on other treatments or steps, if any, carried out in connection with a scale prevention program, for example, it may be preferred to mechanically clean the tubing and pumps or to acidize or wash the formation, casing perforations and other subsurface equipment prior to carrying out a scale inhibitor squeeze treatment. Spearhead or buffer slugs of water, surfactants, wetting agents and polymers may be used to better distribute and place the inhibitor solution and prevent unexpected premature precipitation. Generally, injection of the scale inhibitor solution is designed to at least extend at least a foot from the center of the wellbore and more preferably more than two feet radially from the center of the wellbore. It is to be expected that the life of a given scale inhibitor precipitation treatment will be a function of the distance from the wellbore at which precipitation takes place. The rate of inhibitor injection is not critical and varies with the fracture pressures of the formation, the extent of the formation, the permeabilities to water flow of the formation, producing patterns around the wellbore, and other conventionnal conditions used in designing liquid treating procedures. For best results, the inhibitor solution injection pressure should be kept about 200 psi below the formation liquid fracturing pressure. In addition, the scale inhibitor solution is injected at a fast enough rate to avoid all of the solution channelling or flowing into only a small part of the brine producing formation. In between the above-mentioned two injection rate limits any practical rate may be used. Generally, higher rates result in greater penetration and better correspondence with the way the scale forming brine is produced through the formation into the wellbore. Diverting agents, as well as conventional coiled tubing units to insure adequate diversion, may be used for more uniform distribution and placement and precipitation of the scale inhibitor. Obviously, the concentration of scale inhibitor used per treatment depends on conventional considerations, such as for example, concentration as received, solubilities at different pH, effects of downhole temperature and pressure, total amount of liquid to be injected and the like. The scale inhibitor can be injected in stages with or without intervening steps, precipitation, or spaces or injectivity changing slugs. Generally the scale inhibitor solution will be overdisplaced into the formation with water, crude oil, or other fluid to assure that the scale inhibitor will not be precipitated in the wellbore.

In the process of this invention after the scale inhibitor solution has been approppriately injected into the formation, the scale inhibitor is precipitated to the interstices in the formation matrix by subjecting the solution to a fluid which lowers the pH to a value to cause significant precipitation of the scale inhibitor. The scale inhibitor, therefore, is precipitated by change in pH and not by divalent cations. The scale inhibitor precipitate, therefore, is formed in the presence of an excess of mobile, non-plugging fluids. The advantage of this is that it assures that the formation is not plugged by the precipitated scale inhibitor. When formation production is resumed oil, gas and/or brine, therefore, can flow through the pores of the formation previously occupied by the moble non-plugging fluid thereby assuring that, as scale forming brine is produced, it will flow over and around and contact precipitated scale inhibitor. Since the solubility of the scale inhibitor is pH dependent and is decreased significantly when the pH is lowered, the inhibitor is precipitated by subjecting it to a fluid which lowers the pH of the scale inhibitor solution. Any suitable pH lowering fluid may be used provided that it does not plug the formation. For example any solution having a low pH, for example, hydrochloric acid, ammonium chloride, carbon dioxide or the like, may be used, but generally acids having a pH below the desired lowered pH of the scale inhibitor solution are preferred except sulfuric acid because the salts of some sulphates have low solubility and precipitate out. If a substance (for example, carbon dioxide) capable of forming an acidic solution or an solution is selected for precipitating the scale inhibitor, the substance or acidic solution is injected into the well and thence into the formation in sufficient quantity at sufficient pressure to lower the pH of the scale inhibitor to the desired value. Generally, after injection and possible overflush, the well is shut in for a suitable time to allow the injected solution to equilibrate and precipitate the scale inhibitor. It is unnecessary to inject an acidic solution if the well produces fluids that contain substances, for example, carbon dioxide or hydrogen sulfide, that form an acidic pH with water. In such situations, after the scale inhibitor solution has been placed in the formation, the pH of inhibitor solution may be lowered by keeping the well shut in and allowing formation fluids to equilibrate with inhibitor solution, thereby precipitating scale inhibitor from the previously injected scale inhibitor solution.

After the scale inhibitor solution has been injected and precipitated, production from the well is reinstituted. The precipitated scale inhibitor is slowly dissolved and as it is produced, it inhibits the formation of damaging scale deposits in the formation in the vicinity of the wellbore, casing perforations, tubing, and other downhole equipment. The scale treatment may be placed on a regular schedule or monitored by standard chemical detection and measuring techniques. The scale preventive treatment of this invention may be repeated on a regular basis based on experience, or when the chemical return concentration falls below threshold requirements or when other scale forming indicators indicate that the treatment should be applied.

Although the process of the invention has been described with a certain degree of particularity in order to convey, by example, a basic understanding of the invention sufficient to enable one of average skill in the art of petroleum production to practice the invention, it is to be expected that the specific conditions and ranges of some parameters herein described may be altered in some degree without departure from the basic principles underlying the invention. It is therefore intended that alterations and modifications which do not entail an abandonment of the basic concepts upon which the invention is based shall be considered as circumscribed by the spirit and scope of the invention except as the same may be necessarily limited by the appended claims or reasonable equivalents thereof.

I claim:

1. A method for inhibiting scale formation in a well producing brine from a subsurface fluid producing formation comprising injecting into said well and thence into said formation a solution of scale inhibitor in water, said inhibitor solution having a first pH, and said inhibitor solution being capable of having a second pH lower than said first pH which will cause precipitation of scale inhibitor in said formation, said scale inhibitor being characterized by the fact that said scale inhibitor is significantly more soluble in water at said first pH than said scale inhibitor is soluble in water at said second pH, allowing said formation to produce formation fluid that has a third pH lower than said second pH so that said inhibitor solution is subjected to said formation fluid to lower said first pH of said inhibitor solution to said second pH to precipitate scale inhibitor in said formation by keeping said well shut in and allowing said formation fluid to equilibrate with said inhibitor solution, and producing brine from said formation through said well.

2. The method of claim 1 wherein the scale inhibitor is comprised of at least one amine phosphonate having the general structure:

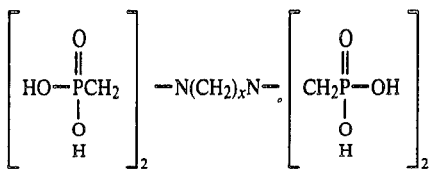

where x is equal to or greater than 2.

3. The method of claim 2 wherein said scale inhibitor is comprised of ethylenediaminetetra (methylenephosphonic acid).

4. The method of claim 3 wherein said first pH of said inhibitor solution is at least 6 and said second pH is less than 5.

5. The method of claim 2 wherein the scale inhibitor is comprised of hexamethylenediaminetetra (methylenephosphic acid).

6. The method of claim 5 wherein said first pH of said inhibitor solution is at least 6 and said second pH is less than 5.

7. A method for inhibiting scale formation in a well producing brine from a subsurface formation comprising:
   injecting into said well and thence into said formation a solution of scale inhibitor in water wherein said scale inhibitor is comprised of at least one amine phosphonate having the general structure:

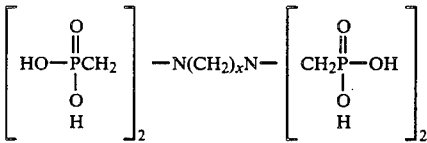

where x is equal to or greater than 2;
said inhibitor solution having a first pH;
thereafter subjecting said inhibitor solution to a fluid which lowers the pH of said inhibitor solution to a second pH to cause precipitation of scale inhibitor in said formation, said scale inhibitor being significantly more soluble in water at said first pH than at said second pH; and,
producing brine from said formation through said well.

8. The method of claim 7 wherein said scale inhibitor is comprised of ethylenediaminetetra (methylenephosphonic acid).

9. The method of claim 8 wherein said first pH of said inhibitor solution is at least 6 and said second pH is less than 5.

10. The method of claim 7 wherein said scale inhibitor is comprised of hexamethylenediaminetetra (methylenephosphonic acid).

11. The method of claim 10 wherein said first pH of said inhibitor solution is at least 6 and said second pH is less than 5.

12. The method of claim 7 wherein said inhibitor solution is subjected to a fluid which lowers said first pH of said solution to said second pH by injecting an acidic solution having a pH below said second pH into said well and thence into said formation.

13. The method of claim 12 wherein said scale inhibitor is comprised of ethylenediaminetetra (methylenephosphonic acid).

14. The method of claim 13 wherein said first pH of said inhibitor solution is at least 6 and said second pH is less than 5.

15. The method of claim 12 wherein said scale inhibitor is comprised of hexamethylenediaminetetra (methylenephosphonic acid).

16. The method of claim 15 wherein said first pH of said inhibitor solution is at least 6 and said second pH is less than 5.

17. The method of claim 7 wherein said inhibitor solution is subjected to a fluid which lowers said first pH of said inhibitor solution to said second pH by injecting into said well and thence into said formation a substance that at formation conditions lowers said first pH to said second pH.

18. The method of claim 17 wherein said scale inhibitor is comprised of ethylenediaminetetra (methylenephosphonic acid).

19. The method of claim 18 wherein said first pH of said inhibitor solution is at least 6 and said second pH is less than 5.

20. The method of claim 17 wherein the scale inhibitor is comprised of hexamethylenediaminetetra (methylenephosphonic acid).

21. The method of claim 20 wherein said first pH of said inhibitor solution is at least 6 and said second pH is less than 5.

* * * * *